United States Patent
Gruet et al.

(10) Patent No.: US 9,801,194 B2
(45) Date of Patent: Oct. 24, 2017

(54) ADAPTATION OF A TELECOMMUNICATIONS NETWORK TO CHANGES IN CONFIGURATION

(71) Applicant: Cassidian SAS, Elancourt (FR)

(72) Inventors: Christophe Gruet, Montigny le Bretonneux (FR); Eric Georgeaux, Montigny le Bretonneux (FR); Gerard Marque-Pucheu, Verneuil (FR)

(73) Assignee: Cassidian SAS, Elancourt (FR)

( * ) Notice: Subject to any disclaimer, the term of this patent is extended or adjusted under 35 U.S.C. 154(b) by 0 days.

(21) Appl. No.: 14/381,384

(22) PCT Filed: Mar. 1, 2013

(86) PCT No.: PCT/EP2013/054206
§ 371 (c)(1),
(2) Date: Aug. 27, 2014

(87) PCT Pub. No.: WO2013/128014
PCT Pub. Date: Sep. 6, 2013

(65) Prior Publication Data
US 2015/0111590 A1    Apr. 23, 2015

(30) Foreign Application Priority Data

Mar. 1, 2012  (FR) ...................... 12 51896

(51) Int. Cl.
*H04W 72/00* (2009.01)
*H04W 72/08* (2009.01)
(Continued)

(52) U.S. Cl.
CPC ......... *H04W 72/085* (2013.01); *H04W 24/02* (2013.01); *H04W 84/047* (2013.01); *H04W 92/12* (2013.01)

(58) Field of Classification Search
CPC ............. H04W 36/30; H04W 36/0005; H04W 36/0016; H04W 36/0066; H04W 72/08;
(Continued)

(56) References Cited

U.S. PATENT DOCUMENTS 8,576,753 B2 * 11/2013 Senarath ................ H04B 7/155
370/279
2008/0125125 A1 * 5/2008 Choi .................. H04W 36/0083
455/436

(Continued)

FOREIGN PATENT DOCUMENTS

| | | |
|---|---|---|
| CN | 102148638 A | 8/2011 |
| EP | 2400786 A1 | 12/2011 |
| WO | WO-2010056072 A2 | 5/2010 |

OTHER PUBLICATIONS

International Search Report and Written Opinion for PCT/EP2013/054206 mailed Apr. 16, 2013 (16 pages).

*Primary Examiner* — Olumide T Ajibade Akonai
*Assistant Examiner* — Eboni Hughes
(74) *Attorney, Agent, or Firm* — Gardere Wynne Sewell LLP (57) ABSTRACT

A telecommunications network, especially an LTE type network, is adapted to a change in configuration. The telecommunications network includes at least a first transmission device, of base station or transmission relay type, and a second transmission device, of base station or transmission relay type. There is no radio link in existence between the first transmission device and the second transmission device before the change in configuration. The process for change includes: detecting a change in the configuration of the telecommunications network; allocating radio resources in the communications frames of the first communications element for determination of the transmission quality with the second communications element; and (Continued)

establishing a radio link between the first transmission device and the second transmission device if the determined transmission quality is advantageous. The process is implemented by a telecommunications networking infrastructure and by a transmission device.

8 Claims, 3 Drawing Sheets

(51) Int. Cl.
  *H04W 24/02* (2009.01)
  *H04W 84/04* (2009.01)
  *H04W 92/12* (2009.01)

(58) Field of Classification Search
  CPC . H04W 72/085; H04W 36/0072; H04W 4/06; H04W 74/004; H04W 72/005
  See application file for complete search history.

(56) References Cited

U.S. PATENT DOCUMENTS

| | | | |
|---|---|---|---|
| 2010/0227620 A1 | 9/2010 | Naden et al. | |
| 2011/0244788 A1* | 10/2011 | Ode | H04B 7/022 455/7 |
| 2011/0275363 A1* | 11/2011 | Kwon | H04W 48/18 455/422.1 |
| 2013/0088995 A1* | 4/2013 | Chun | H04B 7/0626 370/252 |
| 2013/0137434 A1* | 5/2013 | Godin | H04W 8/24 455/436 |
| 2013/0273926 A1* | 10/2013 | Peng | H04B 7/15528 455/450 |
| 2014/0313969 A1* | 10/2014 | Kalhan | H04W 36/0072 370/312 |

* cited by examiner

ADAPTATION OF A TELECOMMUNICATIONS NETWORK TO CHANGES IN CONFIGURATION

The field of this invention is a method for adapting a telecommunications network to a change in configuration. Essentially, its purpose is to improve continuity of services in certain types of telecommunications networks, using relay type equipment able to be connected to a main, base network; these relay devices act as a local base station for the user equipment present in an area covered by said local base station.

This invention will be described more specifically within the context of an LTE ("Long Term Evolution") network (but is not limited to this context), the method according to the invention able to be extended to other types of networks with architecture and operation comparable to that of an LTE.

We refer, especially, to the 3GPP TS 36.216 and 3GPP TS 36.311 standards, especially for the definitions of the organization of communications frames, MBSFN subframes, or other elements involved in the following description.

In the field of telecommunications, there are broadband public mobile telecommunications networks, that use broadband technology (e.g., the LTE type) or WiMAX (Worldwide Interoperability for Microwave Access). Public networks also allow for operators to serve a large part of a national or regional territory, such as the European territory.

Figure 1:
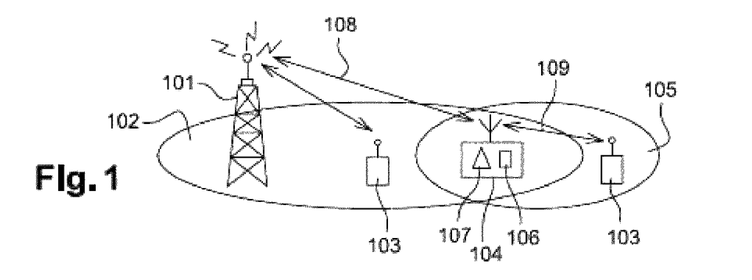
FIG. 1, already described, schematically illustrates an LTE type telecommunications network using a communications relay.

Conventionally, as illustrated in FIG. 1, in this type of radio communications network, which is organized in a conventional manner, especially with main base stations 101 connected to each other to ensure coverage of a large territory, each base station 101 covers a specific territory 102 within which mobile equipment 103 can exchange data with said base station 101. This type of network also offers the ability to locally and/or temporarily improve its capacities. For this purpose, this type of network is expected to have relay type electronic equipment 104, which serve as intermediaries between user devices 103 (usually mobile communications terminals) and the main base stations 101. The relays 104 are then considered by the main base stations 101 as mobile devices 106, and are considered by user equipment 103 present in a zone 105 covered by the relay 104 as local base stations 107, through which the signals exchanged on the telecommunications network in question must pass.

In general, a communications device, called "donor" or "donor eNodeB", is able to connect to relay type equipment, especially by establishing a radio link with it, said relay communications being considered by the donor as a user device.

This ability to employ relays 104 allows increased density of mobile equipment within a small area for a limited duration, for example, during the organization of popular sporting events, or, for example, during deployment of armed forces in a target area.

The relays 104 employed are able to operate on the same frequency bands at the same time to exchange information, via a main link 108 (or backhaul link) with the main base station to which they are connected, and with the mobile user equipment, via an access link 109 connected to them. This is called common band relay operation or "inband relay" in English.

Figures 2A, 2B:
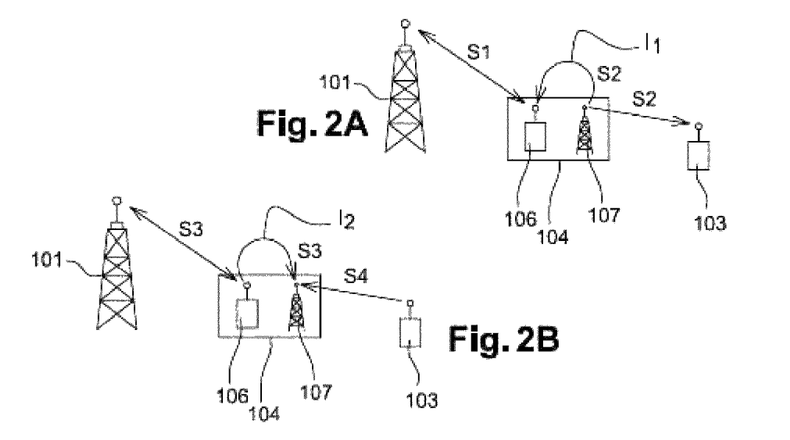

This type of operation imposes some significant constraints, however, as illustrated in FIGS. 2-A and 2-B. The implementation of the method according to this invention proposes a real advantage for networks using this type of operation.

In effect, as shown in FIG. 2-A, due to the use of the same frequency band for, in downstream mode, transmissions of first signals S1 from the main base stations 101 to the relays 104 used as mobile communications equipment 106, and second signal S2 transmissions from relays 104 used as local base stations 107 to user equipment 103, there is a significant risk of interference 11, in which the second signals S2 may be inadvertently received by the relays in use as mobile communications equipment 106.

Likewise, as shown in FIG. 2-B, due to the use of the same frequency band for, in upstream mode, transmissions from third signals S3 coming from the relay 104 used as mobile equipment 106 to the main base station 101, and transmissions of fourth signals S4 from the user equipment 103 to the relays 104 used as a local base station 107, there is a significant risk of interference 12, as the third signals S3 may be inadvertently received by the relay 104 in use as a local base station 107.

To prevent such interference systematically present when a specific isolation is not provided between the mobile equipment 106 of the relays 104 and the local base station 107 of the relays 104, interference which could have adverse consequences on the quality of service available to user equipment 103, it has been necessary to carefully organize communication frames exchanges between the different equipment in use.

Figure 3:
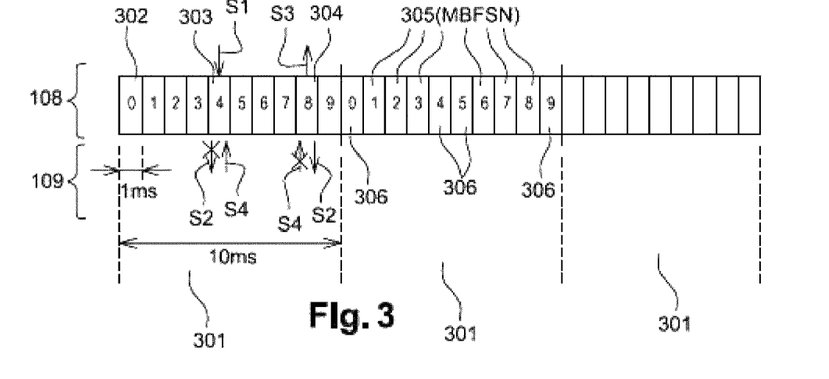
FIG. 3, also already described, is a schematic representation of communication frames, and their cutting, exchanged in an LTE type network.

Thus, for an LTE type network, we propose an organization of frames as illustrated in FIG. 3.

In LTE type networks, successive communications frames 301 exchanged between different equipment on the network have a duration of 10 milliseconds. Each frame is divided into a sub-frame 302 of one millisecond each. Then, to resolve the problems mentioned above, we propose that when the first signals S1 are sent, they be transmitted by a specific subframe 303, which cannot be used to send second signals S2; the subframe 303 may instead be used to receive the fourth signals S4.

Likewise, when the third signals S3 are transmitted by a specific subframe 304, it cannot be used to transmit the fourth signals S4; the subframe 304 may rather be used to transmit the second signals S2.

Additionally, we distinguish two distinct types of subframes in LTE networks. A first group 305 of sub-frames is composed of these subframes, called operating subframes (in standards, referred to as MBSFN subframes, or Multicast-Broadcast Single Frequency Network), which allow the main base station 101 to communicate with the relay 104 a number of operational data from the LTE network in question in order to define a radio interface, meaning, to define the rules of exchange between the main base station 101 and the relay 104 in question. It is via these subframes that the main base station 101 transmits to the relay 104 the information that a base station normally receives from the network to which it is connected, meaning, the "user plane" exchanges related to the subscribers served by the relay, as well as the "control plane" exchanges regarding the relay acting as a donor (eNodeB) vis-à-vis the core of the network.

A second group of subframes 306 is composed of said subframes, called "access subframes" which authorize communications between the users and the relay to which their equipment is connected. It is through these subframes, especially, that the essential information for the user equipment connected to the relay in question are sent (systems information type information and data for synchronization of the user equipment involved).

The allocation of operating subframes 305 and access subframes 306 is fixed within a communications frame 301;

thus, subframes numbers 1, 2, 3, 6, 7, and 8 are configured as MBSFN subframes, or access frames, while subframes 0, 4, 5, and 9 are always access subframes.

In the LTE network, once a relay establishes the rules for exchange with the main base station to which it is connected, its operation is fixed; this means that the relay in question is not able, while continuing to ensure continuity of service for the user equipment connected to it, to select a new main base station that would allow it to improve its performance in terms of quality of service.

This operation can be troublesome in various cases. A first case for considering and a second are illustrated, respectively, in FIG. 4 and FIG. 5.

Figure 4:
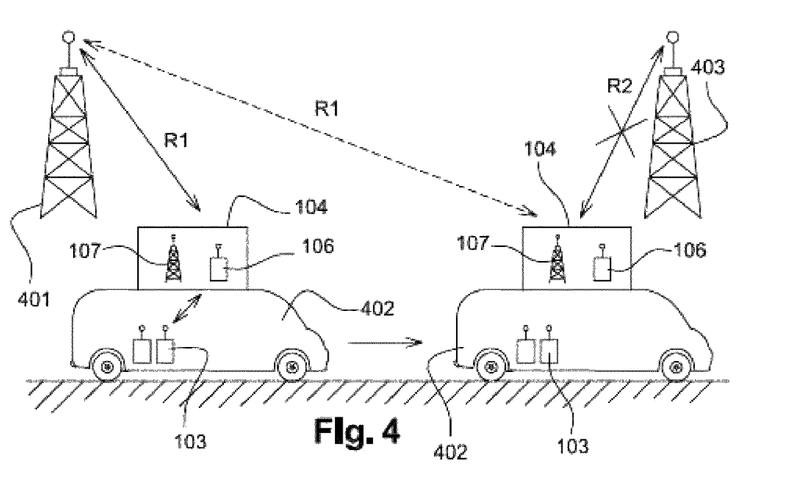
FIG. 4, also already described, is a first schematic representation of a first configuration change resulting, in the prior art, in discontinuity of services to user equipments.

In FIG. 4, we show how a relay 104 that has established a radio interface R1 with a first main base station 401, is mobile, for example, by being available in a moving vehicle 402; it is not able while moving to choose a new main base station 403 and define with it a new radio interface R2 without losing its status as a local base station for user equipment 103 connected to it for at least a few moments. The only way for the relay 104 to define a new radio interface R2 with the new base station 403 is to break its connection with the user equipment 103 connected to it in order to have the time to position itself as a mobile device with the new base station 403 and redefine the new radio interface R2. It is only once it has been recognized as a communication intermediary by the new main base station 403 that the relay 104 can function as a local base station 107 for the user equipment 103 connected to it. This problem also occurs when a main base station 101 malfunctions, for example, with a technical problem, or if it is destroyed, which requires the relay 104 to define a new radio interface with a new main base station.

Figure 5:
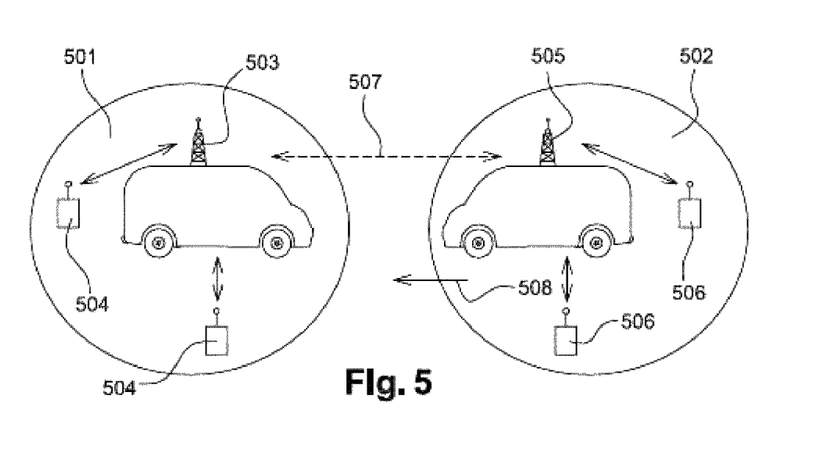
FIG. 5, also already described, is a second schematic representation of a second configuration change resulting, in the prior art, in failure of communications between different user equipment.

In FIG. 5, we illustrate a situation in which a first cell 501 and a second cell 502, in movement 508, operate independently, following the operating principles of an LTE type communications network. We find, thus, in the first cell 501 a first base station 503 to which is connected a first group of user equipment 504, and, in the second cell 502, a second base station 505 to which is connected a second group of user equipment 506. If at least one of the two cells 501 and 502 is moving, it is possible for the main base station for one of these two cells to enter into the coverage area of the other cell. However, despite this proximity, which allows establishment of a satisfactory radio connection 507 between the various equipment, there is currently no means to ensure the exchange between the user device 504 and user device 506. The establishment of such a radio connection 507 allows, for example, the base station 505 to play the role of a relay serving the user equipment 506, said relay being, itself, connected to the base station 503. The mobile devices 504 and 506 may, thus, communicate with each other through the two cells 501 and 502 connected by the radio connection 507.

The above examples demonstrate that LTE type communications networks are not adapted to changes in configuration. By "change in configuration", we mean any modification of the geographical distribution of the operating elements comprising the network in question, the operating elements being comprised of the main base stations and/or relays. The modifications in question may have various causes, for example, movement of at least one of the operating elements in question, and/or the disappearance or appearance of one of these operating elements.

Such changes in configuration require a redefinition of a new radio interface between a relay and a main base station in order to ensure better quality of service, without discontinuity of service for the user equipment served by the relay in question. But to this day, when definition of a new radio interface is needed, it requires dropping service for the mobile equipment dependent on the relay in question.

The method according to the invention is intended to resolve the above-mentioned problems, and improve the situation in existing LTE type telecommunications networks, or, in any type of similar network. In the invention, we offer solutions to allow a communications relay device to connect to a main base station other than that on which it depended, or simply to connect to a main base station if, prior to a change in configuration of the network, it was not connected to any main base station. For this purpose, in the invention, we plan a new organization of communication frames transmitted at the level of the relay in question, at least for a duration sufficient to manage the change in configuration observed.

This invention, thus, essentially relates to a method for adapting a telecommunications networks, especially an LTE type network, to a change in configuration, said telecommunications network including at least:
  a first transmission device, of base station or transmission relay type;
  a second transmission device, of base station or transmission relay type, no radio link existing between the first transmission device and the second transmission device prior to the change in configuration;
  characterized in that it has different steps consisting of:
  detecting a change in the configuration of the telecommunications network;
  allocating radio resources, in communications frames of the first transmissions device, to determine the transmission quality with the second transmission device;
  establishing a radio link between the first transmission device and the second transmission device if the determined transmission quality is advantageous.

By "advantageous transmission quality", we mean a quality of transmission, defined, for example, by the signal reception intensity criteria, or by an insignificant number of errors in the signal transmissions, which is better than a previously existing transmission quality (or that didn't exist) between the first communications element and a donor to which it was connected prior to the configuration change.

In addition to the main features of the method according to the invention above-mentioned, the process according to the invention implements the following additional features, alone or in any technically feasible combination:
  the step for allocation of radio resources in the communications subframes of the first transmission device, in order to determine the transmission quality with the second transmission device, is temporary, and ends when the radio link is established between the first transmission device and the second transmission device;
  in the radio link established between the first transmission device and the second transmission device, one of the two transmission devices is a donor type element;
  the configuration change detection step includes an operation for detecting movement of the first transmission device, and/or an operation for detecting the disappearance of a third transmission device to which the first transmission device was connected by a radio link;
  the first device is a relay type transmission device, operating in the same frequency band to establish a radio link with a base station, and to establish a radio link with the user equipment connected to the relay;

the radio resources allocation step, in the communications frames of the first transmission device, dedicated to determination of transmission quality with the second transmission device, is conducted on MBSFN subframes;

the radio resources allocation step, in the communications frames of the first transmission device, dedicated to determining the transmission quality with the second transmission device, is conducted on the access subframes;

the method includes an additional step, consisting in sending from the first transmission device a specific sequence present in the last symbol of certain communications frames subframes;

the subframes used to send the specific sequence are the MBFSN subframes.

This present invention also relates to a telecommunications networking infrastructure, especially the LTE type network, said networking including at least:

a first transmission device, of base station or transmission relay type;

a second transmission device, of base station or transmission relay type;

characterized in that said infrastructure includes means to implement the method for adaption of said telecommunications network, according to the invention, to a change in configuration, no radio link existing between the first transmission device and the second transmission device before the configuration change, said means for implementation including in particular:

means for detecting a change in the configuration of the telecommunications network;

means for determining the transmission quality with the second transmission device, said means for determination implementing means for allocation of radio resources in the communications frames of the first transmission device;

means for establishing a radio link between the first transmission device and the second transmission device if the determined transmission quality is advantageous.

This invention relates, finally, to a transmission device able to communicate on a telecommunications network, especially an LTE type network, characterized in that said transmission device includes means to implement the method for adaption of said telecommunications network, according to the invention, to a change in configuration, no radio link existing between the said transmission device and the second transmission device before the configuration change, said means for implementation including in particular:

means for detecting a change in the configuration of the telecommunications network;

means for determining the transmission quality with the second transmission device, said means for determination implementing means for allocation of radio resources in the communications frames of the said transmission device;

means for establishing a radio link between the said transmission device and the second transmission device if the determined transmission quality is advantageous.

Other features and advantages of the method according to the invention will become clearly apparent form the description given below, for indicative but not limiting purposes, in reference to the attached figures, including:

FIGS. 2-A and 2-B, also already described, schematically represent the malfunction risks in LTE type networks operating as "inband relay" types;

For reasons of clarity, only those elements essential to the understanding of the invention have been shown, schematically, and not at scale. Furthermore, unless otherwise specified, the same element appearing in different figures retains the same reference designation.

Figure 6:
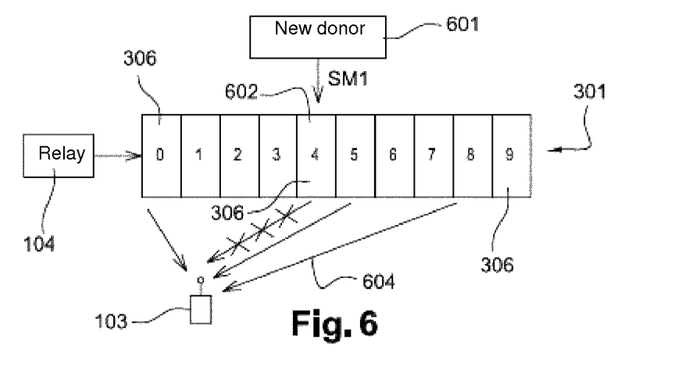
FIG. 6 is a schematic representation of a first exemplary embodiment of the method according to the invention.

FIG. 6 illustrates a first example of implementation of the method according to the invention.

In this embodiment, we propose that at least one access subframe 306 (subframes numbered 0, 4, 5, and 9) at the level of the communications relay be able to be used to determine the possible presence of a new transmitter 601 on the LTE network in question, which would enable establishment of a radio link, either of better quality than the radio link between the relay in question and a first main base station, or in the absence of such a link.

Propitiously, we do not use all of the access subframes to determine the possible presence of a new transmitter; for example, a single subframe 602 may be sufficient, the other access subframes maintaining their initial role to ensure the access link between the relay 104 in question and the user equipment connected to it.

Each access subframe 602 thus chosen to determine the possible presence of a new donor 601 on the LTE network in question is no longer used for its usual operation downstream from the access link 604 to the user equipment 103 that is connected to it. Thus, we ensure continuity of service for the user equipment 103 connected to the relay 104 in question, which can continue to interact with the relay 104, even if the quality of service may be affected due to unavailability of subframes allocated to determine the possible presence of a new donor 601 on the LTE network. These selected access subframes, allocated, are then used, downstream, to receive signals SM1 transmitted from one or more transmission devices 601 that are able to work as a main base station on the LTE network involved for the relay 104 in question.

Then, we use the relay 104 in question for measuring the amplitude and/or the quality of signals SM1 received (for example, by examining an error rate in the signals received) to determine if one of the transmissions devices subject to such measurements is able to become a donor for the relay in question.

The measurement operations are then used to decide if a new transmission device 601 can be used as donor for the relay in question.

Allocation operations for certain access subframes for the operations described above are only temporary, and only impact the access link between the relay 104 and the mobile equipment 103 connected to it for a very short time. These allocation operations can be initiated by a change in configuration of the telecommunications network; this change in configuration could be, but is not limited to, the detection of a decrease in the quality of signals received, or the disappearance of the signals received from the initial donor to which the relay is connected by radio link, or the detection of movement of the relay in question. Once the procedure for determination of a possible new donor for the relay [is completed], the subframes that had been allocated resume their initial role by fully participating in the access link between the relay in question and the user equipment 103 connected to it.

Figure 7:
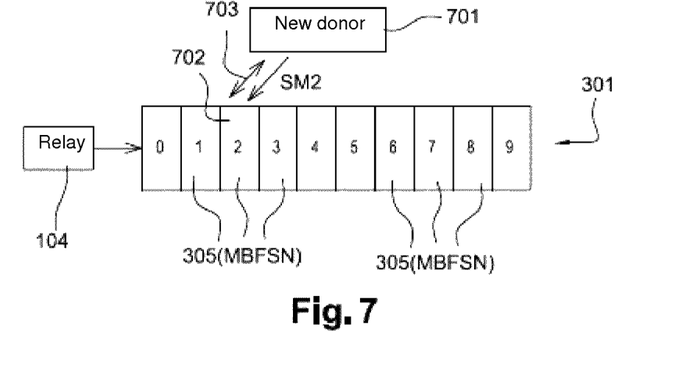
FIG. 7 is a schematic representation of a second exemplary embodiment of the method according to the invention.

FIG. 7 illustrates a second example of implementation of the method according to the invention.

In this embodiment, we propose that at least one of the MBSFN subframe 305 (subframes numbered 1, 2, 3, 6, 7 and 8) at the level of the communications relay 104 be able to be used to determine the possible presence of a new transmitter 601 on the LTE network in question, which would enable establishment of a radio link, either of better quality than the radio link between the relay in question and a first main base station, or directly to compensate for the absence of such a radio link.

Advantageously, we do not use all of the MBSFN subframes to determine the possible presence of such a new transmitter; for example, a single subframe 702 may be sufficient, the other MBFSN subframes maintaining their initial role to ensure the radio interface between the relay 104 in question and the initial donor. The subframe 702 used depends essentially on the operation of a new potential donor 701, which has its own operating rules downstream from the transmitter to the relay 104 in question.

By not using the access subframes dedicated to ensuring the access link between the relay 104 and the user equipment connected to it, we do not affect the quality of service for the user equipments involved at all.

Each subframe 702 is thus used to receive information 703 from the new, potential donor 701, in order to determine if its transmission rules are compatible with the downstream transmission rules established by the relay 104 in question to the communications equipment, for example, of other communications relays connected to it. If not, the relay 104 can redefine new transmission rules between itself and the other communications equipment to which it is connected.

These selected access subframes, allocated, are then used, downstream, to receive signals SM2 transmitted from one or more transmission devices 701 that are able to work as a main base station on the LTE network involved for the relay 104 in question.

Then, we use the relay 104 in question for measuring the amplitude and/or the quality of signals SM2 received (for example, by examining an error rate in the signals received) to determine of one of the transmissions devices subject to such measurements is able to become a donor of the relay in question.

The measurement operations are then used to decide if a new transmission device 701 can be used as donor for the relay, provided that compatibility of their transmission rules is ensured.

The allocation of certain subframes for the operations described above is only temporary. Again, these allocation operations can be initiated by a change in configuration of the telecommunications network; this change in configuration could be, but is not limited to, the detection of a decrease in the quality of signals received, or the disappearance of the signals received from the initial donor to which the relay is connected by radio link, or the detection of movement of the relay in question. Once the procedure for determination of a possible new donor for the relay and the appropriate connection operations have been effectuated, normal operation, as defined in the standards, is resumed.

Thus, in this second embodiment of the method according to the invention, by defining configurable MBSFN subframes to define the new exchanges between the relay and the possible new donor, said new exchanges are added to the exchanges already existing between the relay and the current donor; this allows for the option of executing a plurality of operations related to a change in configuration of the network, and especially related to the mobility of the relay: from the point of view of the new, potential donor, the possibility of broadcasting systems data, and transmitting signals allowing the relay to detect it, and from the point of view of the relay, the option to take measurements and start new communications with the new donor detected. Among the systems information broadcast, the new, potential donor especially broadcasts a list of subframes it has available for establishing new radio interfaces. If the relay in question can connect to this new, potential donor (for example, if the received signal strength is sufficient), the relay in question must verify that at least one of these subframes is available on its end, which is not necessarily the case. In effect, if the relay in question is, itself, a donor for another relay, it may be necessary for the relay in question to reconfigure its radio interface in order to make the required subframes available to the new; potential donor; or, in another example, if the relay is already connected to a first current donor, the subframes used for this connection risk of being the same as the subframes required for the new, potential donor; it is necessary, then, to modify the radio interface between the relay in question and the current donor to cancel out this coincidence.

Figure 8:
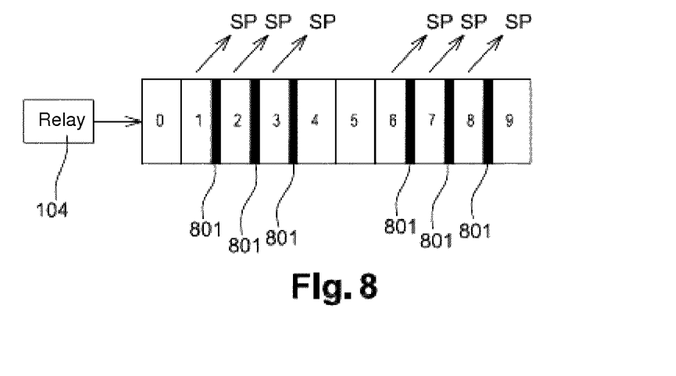
FIG. 8 is a schematic representation of an alternative for mutual detection of cells moving in relation to each other.

FIG. 8 illustrates an alternative for mutual detection of mobile cells, as in the case shown in FIG. 5. In this embodiment, the communications relay 104 systematically issues, upstream, a particular SP sequence, using the last symbol 801 of certain subframes, advantageously, the MBFSN subframes 305, in a manner identical to that of a terminal configured to issue an SRS (Sounding Reference Signal) type signal. Thus, the other mobile cells can permanently detect the presence of neighbouring cells, including relay equipment 104, by simple detection of specific SP sequences.

The invention claimed is:

1. A method for adapting a telecommunications network to a change in configuration of the telecommunications network due to one or more of: decrease in signal quality, loss of signal or device movement, said telecommunications network including at least:

a relay type transmission device configured to communicate with user equipment using a plurality of access sub-frames within a communications frame, said access sub-frames designated for communications between the relay type transmission device and the user equipment;

a first base station transmission device configured to communicate with the relay type transmission device over a first radio link using multicast-broadcast single frequency network (MBSFN) sub-frames of said communications frame, said MBSFN sub-frames designated for communications between relay type transmission device and the first base station; and a second base station transmission device, wherein no radio link exists between the relay type transmission device and the second base station transmission device prior to the change in configuration;
the method comprising:
  using said plurality of access sub-frames of said communications frame for communication between the relay type transmission device and the user equipment;
  detecting the change in the configuration;
  in response to said detecting, allocating by the relay type transmission device of at least one access sub-frame of said plurality of access sub-frames of said communications frame to permit the relay type transmission device to determine during said allocated at least one access sub-frame the presence of the second base station transmission device and a transmission quality with the second base station transmission device while simultaneously using other access sub-frames of said plurality of access sub-frames of said communication frame that are not allocated to continue to be used by the relay type transmission device for communication with the user equipment; and
  establishing a second radio link between the relay type transmission device and the second base station transmission device if the determined transmission quality is of better quality than the first radio link.

2. The method according to claim 1, wherein the step of allocating comprises a temporary allocation of said at least one access sub-frame and further comprising terminating said temporary allocation when the second radio link is established.

3. The method according to claim 1, wherein the second radio link is a donor type element.

4. The method according to claim 1, wherein detecting comprises one or more of detecting movement of the relay type transmission device, detecting disappearance of a transmission device to which the relay type transmission device was connected by a radio link.

5. The method according to claim 1, wherein the relay type transmission device operates in a same frequency band to establish the first radio link with the first base station transmission device and further to establish the second radio link with the user equipment.

6. The method according to claim 1, further comprising sending by the relay type transmission device of a specific sequence present in the last symbol of certain ones of the MBSFN sub-frames.

7. A telecommunications networking infrastructure including at least:
  a relay type transmission device configured to with user equipment using a plurality of access sub-frames within a communications frame, said access sub-frames designated for communications between the relay type transmission device and the user equipment;
  a first base station transmission device configured to with the relay type transmission device over a first radio link using multicast-broadcast single frequency network (MBSFN) sub-frames of said communications frame, said MBSFN sub-frames designated for communications between relay type transmission device and the first base station;
  a second base station transmission device;
  wherein the networking infrastructure is configured to implement a method for adaption of said telecommunications network to a change in configuration of the telecommunications network due to one or more of: decrease in signal quality, loss of signal or device movement, wherein no radio link exists between the relay type transmission device and the second base station transmission device before the change in configuration, comprising:
    means for using said plurality of access sub-frames of said communications frame for communication between the relay type transmission device and the user equipment;
    means for detecting said change in configuration;
    means for determining transmission quality between the relay type transmission device and the second base station transmission device by having the relay type transmission device, in response to said detecting, allocate at least one access sub-frame of said communications frame to permit the relay type transmission device to determine during said allocated at least one access sub-frame the presence of the second base station transmission device and a transmission quality with the second base station transmission device while simultaneously using other access sub-frames of said plurality of access sub-frames of said communication frame that are not allocated to continue to be used by the relay type transmission device for communication with the user equipment; and
    means for establishing a second radio link between the relay type transmission device and the second base station transmission device if the determined transmission quality is of better quality than the first radio link.

8. A relay type transmission device able to communicate on a telecommunications network with user equipment using a plurality of access sub-frames within a communications frame, said access sub-frames designated for communications between the relay type transmission device and the user equipment, and communicate with a first base station transmission device over a first radio link using multicast-broadcast single frequency network (MBSFN) sub-frames of said communications frame, said MBSFN sub-frames designated for communications between relay type transmission device and the first base station, said telecommunications network further including a second base station transmission device, wherein said relay type transmission device is configured to implement a method for adaption of said telecommunications network to a change in configuration of the telecommunications network due to one or more of: decrease in signal quality, loss of signal or device movement, wherein no radio link exists before the change in configuration between said relay type transmission device and the second base station transmission comprising:
  means for using said plurality of access sub-frames of said communications frame for communication between the relay type transmission device and the user equipment;
  means for detecting the change in the configuration;
  means for determining transmission quality between the relay type transmission device and the second base station transmission device by having the relay type transmission device, in response to said detecting, allocate at least one access sub-frame of said plurality of access sub-frames of said communications frame to permit the relay type transmission device to determine during said allocated at least one access sub-frame the presence of the second base station transmission device and a transmission quality with the second base station transmission device while simultaneously using other access sub-frames of said plurality of access sub-frames of said communication frame that are not allocated to continue to be used by the relay type transmission device for communication with the user equipment; and means for establishing a second radio link between the relay type transmission device and the second base station transmission device if the determined transmission quality is of better quality than the first radio link.

\* \* \* \* \*

UNITED STATES PATENT AND TRADEMARK OFFICE
CERTIFICATE OF CORRECTION

PATENT NO. : 9,801,194 B2
APPLICATION NO. : 14/381384
DATED : October 24, 2017
INVENTOR(S) : Christophe Gruet et al.

Page 1 of 1

It is certified that error appears in the above-identified patent and that said Letters Patent is hereby corrected as shown below:

In the Specification

At Column 2, Line number 16, please replace the term [[12]] with -- I2 --.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*